(12) United States Patent  (10) Patent No.: US 8,731,058 B1
Gough et al.  (45) Date of Patent: *May 20, 2014

(54) METHOD AND APPARATUS FOR PROCESSING VIDEO DATA

(75) Inventors: Michael L. Gough, Ben Lomond, CA (US); James J. Gough, Ben Lomond, CA (US)

(73) Assignee: Vstream Technologies LLC, Dallas, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/471,350

(22) Filed: May 14, 2012

Related U.S. Application Data

(63) Continuation of application No. 10/730,757, filed on Dec. 8, 2003, now Pat. No. 8,179,971, which is a continuation of application No. 09/203,722, filed on Dec. 1, 1998, now Pat. No. 6,690,731.

(60) Provisional application No. 60/067,481, filed on Dec. 1, 1997, provisional application No. 60/092,736, filed on Jul. 14, 1998, provisional application No. 60/097,436, filed on Aug. 21, 1998.

(51) Int. Cl.
*H04N 7/12* (2006.01)

(52) U.S. Cl.
USPC .................................................. 375/240.12

(58) Field of Classification Search
USPC .......... 375/240.01–240.29; 382/173; 345/441
See application file for complete search history.

(56) References Cited

U.S. PATENT DOCUMENTS

| | | | |
|---|---|---|---|
| 3,891,982 A * | 6/1975 | Cheek et al. | 345/441 |
| 6,185,328 B1 * | 2/2001 | Shiau | 382/173 |
| 6,236,682 B1 * | 5/2001 | Ota et al. | 375/240.16 |
| 6,690,731 B1 | 2/2004 | Gough | |
| 8,179,971 B1 | 5/2012 | Gough | |

* cited by examiner

*Primary Examiner* — Gims Philippe
(74) *Attorney, Agent, or Firm* — Ascenda Law Group, PC

(57) ABSTRACT

A method for diagonal processing of video data includes separating diagonally arranged data from rectilinearly arranged data in a video stream, rotating the diagonally arranged data to a rectilinear position; and compressing the rotated diagonally arranged data by a rectilinear compression algorithm. An apparatus for diagonal processing of video data includes a demultiplexer receptive to a video stream and developing a plurality of separated color planes, a number of address generators associated with the plurality of color planes, and a data compressor receptive to the address generators and operative to compress the plurality of color planes with a rectilinear compression algorithm.

20 Claims, 16 Drawing Sheets

METHOD AND APPARATUS FOR PROCESSING VIDEO DATA

CROSS REFERENCE TO RELATED APPLICATIONS

This application is a continuation of U.S. patent application Ser. No. 10/730,757, filed Dec. 8, 2003, now U.S. Pat. No. 8,179,971, which is a continuation of U.S. patent application Ser. No. 09/203,722, filed Dec. 1, 1998, now U.S. Pat. No. 6,690,731, and claims the priority of U.S. Provisional Patent Application Ser. No. 60/067,481, filed Dec. 1, 1997, U.S. Provisional Patent Application Ser. No. 60/092,736, filed Jul. 14, 1998 and U.S. Provisional Patent Application Ser. No. 60/097,436, filed Aug. 21, 1998, all of which are incorporated herein by reference.

BACKGROUND

This invention relates generally to color digital cameras, and more particularly to the processing of color data generated by the sensor of a color digital camera.

Digital-color cameras are used with computer or other digital processing systems. Such cameras include a sensor array, optics, preprocessing electronics, and a cable or other communication link to transfer data to the digital processing system. Digital cameras are made by Connectix, Intel, and others.

Digital cameras of the prior art often include a solid state sensor including a mosaic of red (R), green (G) and blue (B) sensor elements. Data from the sensor is transmitted to a data processing apparatus to be processed into a series of digital images. However, since there are typically many thousands of sensor elements on a sensor, and since digital video requires frequent updates ("refreshing") in the order of 20-30 times per second, it is not typically practical to provide a transmission medium that is fast enough to send all of the data available from the sensor to the data processing apparatus. In the past, this problem has been addressed by lossy compression techniques that discards a considerable portion of the video data available from the sensor.

Some of the prior art compression technologies provide an interpolation step which occurs before compression. The interpolation step provides collocated RGB values, and allows for luminance/chrominance re-mapping as well as color correction on the chip. While these other design approaches allow the use of standard and well-known technologies, they are very inefficient because they generate 24 bit data in the chip, which is then compressed and sent to the host.

The sensors used in digital cameras are often of the "mosaic" sensor type, where red (R), green (G), and blue (B) pixels are arranged in a matrix. With mosaic type video sensors, groups of pixels are assembled into blocks for processing through conventional compression techniques. This compression is desirable due to the typically limited bandwidth of the connection mechanism between the camera and the digital processing system. A common form of compression utilizes a discrete cosine transform (DCT).

An advantage of using a mosaic type sensor is that it has only one color value per pixel, which allows for rapid compression of the color sensor data. Of the mosaic type video sensors, the "Bayer-2G" mosaic sensor interesting in that it gives twice as many green pixels as red or blue pixels. Green pixels are good for detecting luminance (brightness) values. However, the Bayer-2G mosaic also makes it more difficult to preprocess the color data. That is, the Bayer-2G sensor places the green pixels in a crosshatched pattern, as seen in prior art FIG. 1, which makes the assembly of blocks for compression relatively difficult.

SUMMARY

The present invention manipulates incoming sensor data through a number of filters, while taking the geometry of the sensor into account. These include gamma correction, a demultiplexer, a buffered scheme for creating monochromatic 8×8 blocks, a discrete cosine transform, run length encoding, and Huffman coding. The resulting Huffman codes are transmitted to the host via USB interface logic.

As noted previously, while prior art design approaches allow the use of more standard technologies, they are very inefficient because they generate 24 bit data in the chip, which is then compressed and sent to the host. The present invention achieves a three-fold reduction in the data rate because the data remains 8 bits per pixel instead of 24 bits per pixel. Furthermore, any future improvements in compression technology will benefit from the architecture of the present invention in that the compression ratio gains will be multiplied by a factor of three because interpolation is done on the host, and the compression works directly on the raw sensor data.

The present invention uses "diagonal" preprocessing to assembly green pixel data derived from a Bayer-2G mosaic sensor into blocks that are suitable for discrete cosine transformation (DCT) compression. This preprocessing provides for excellent data compression with superior image quality.

The diagonal preprocessing is accomplished by identifying a diamond shaped block and Rotating the block by 45 degrees. The block is then processed through DCT as a normal compression block, and then is rotated back on the host (i.e. in the digital processing system) side. The leftover "edges" surrounding the diamond shaped block are formed into their own compression block, which is reassembled with the diamond shaped block after DCT compression and decompression. As a result, the DCT blocks can be processed such that the pixels that are closest together are processed together. This results in a sharper image and, in addition, better compression due to a minimization of the variance of the DCT cosine wave. Still further, the process of the present invention spreads the data content over time, reducing data "bursts" which could exceed the data handling capacity of the data bus or of the host digital processing system.

An advantage of the present invention is that it provides a compression technology for the transmission of video sensor data from, for example, a digital camera, that is very efficient in terms of gate count, sensor cost, compression ratio, and image quality.

Another advantage of the present invention over the prior art is that it takes the geometry of the sensor into account. This allows the design to be much more efficient than was heretofore possible.

These and other advantages of the present invention will become apparent to those skilled in the art upon a reading of the following descriptions of the invention and a study of the several figures of the drawing.

DETAILED DESCRIPTION OF EXAMPLE EMBODIMENTS

Figure 1:
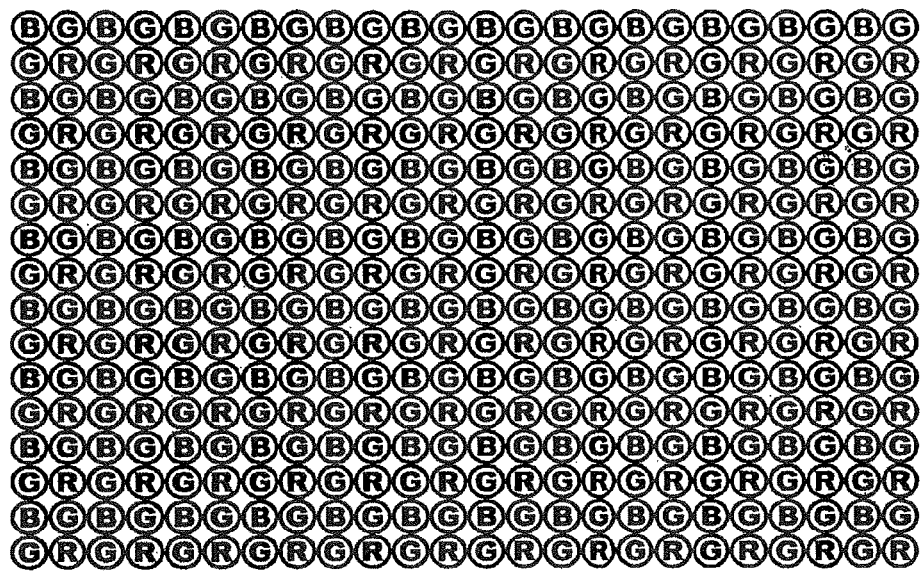
FIG. 1 is an illustration of a prior art Bayer 2-G Mosaic sensor pattern.
Figure 1:
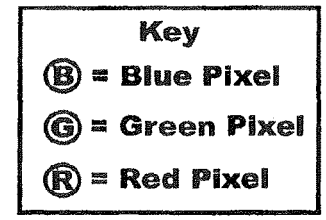
Figure 2:
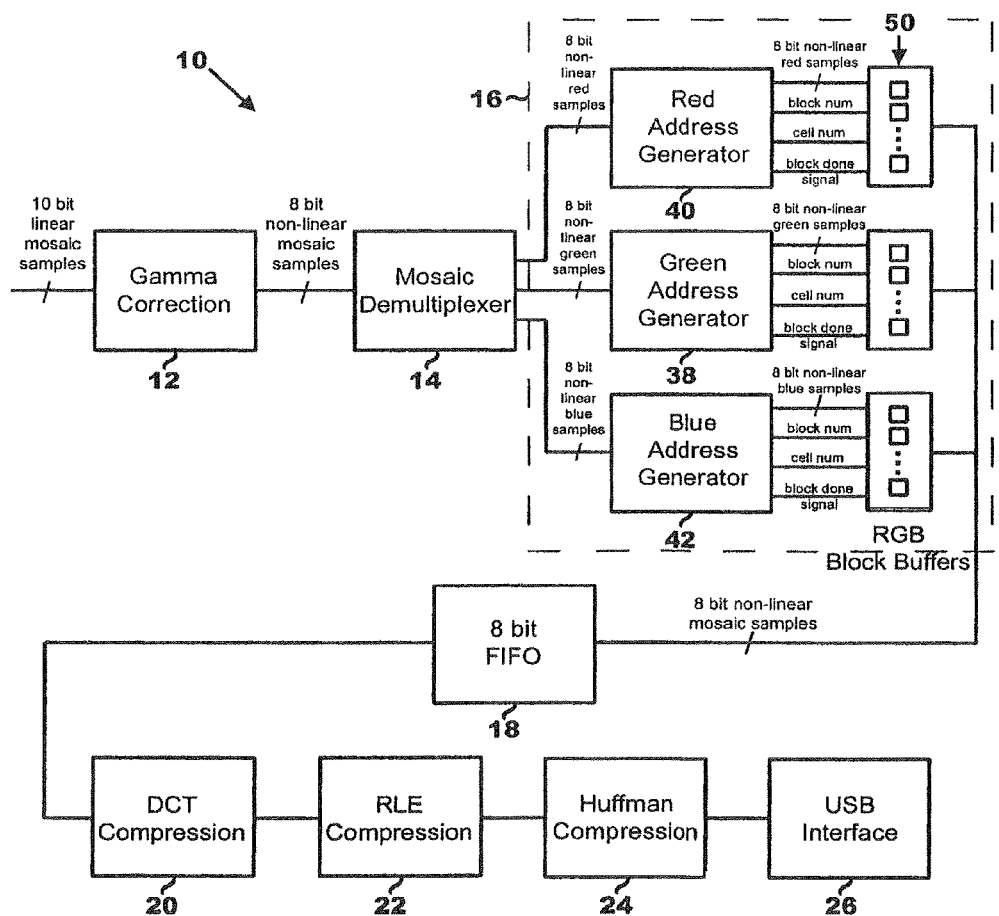
FIG. 2 is a block diagram illustrating a preferred embodiment of the present invention.

FIG. 1 was discussed with reference to the prior art. A block diagram of a preferred embodiment of the present invention is shown in FIG. 2. As noted previously, the present invention manipulates the incoming sensor data through a number of filters. These "filters" include gamma corrector 12, a block generator 16 for creating monochromatic 8×8 blocks, a discrete cosine transformer 20, a run length encoder 22, and a Huffman compressor 24. The filters are coupled together with a Mosaic demultiplexer 14, and a FIFO 18. The resulting Huffman codes are transmitted to the host, such as via an Universal Serial Bus ("USB") interface 26.

First Example Implementation

In FIG. 2, a gamma correction module 12 performs a logarithmic re-mapping of the incoming 10 bit RGB values. This can be achieved via a lookup table that has 1024 entries of 8 bits each. Alternate embodiments of the present invention use other designs for gamma correction that can achieve a reduction in the required gates, e.g. a polynomial curve fit algorithm (which may include splines), often with some reduction in fidelity to the original gamma curve, as will be apparent to those skilled in the art. The output of the gamma correction block is 8 bit non-linear (gamma corrected) samples. The gamma correction block preferably features a dynamically loadable lookup table that is controlled via the USB. There is no differential between the timing of the incoming cells and the outgoing cells, i.e., the relationship is one to one. Therefore no special clock mechanism is required for this block. Gamma corrections modules are well known to those skilled in the art.

The gamma correction module 12 may optionally be preceded and/or followed by a color transformation module (not shown). Such color transformation module(s) convert between color spaces, e.g. RGB to YUV, etc. This can be advantageous in interfacing on a host processor that may require a given color space in order to process the data. If a color correction is performed prior to the gamma correction, it can correct for spectral distortion.

The mosaic demultiplexer 14 receives data from the gamma correction module. The mosaic demultiplexer splits the data into three channels, each representing one of the RGB colors. The timing of this block is dependent on the timing of the mosaic, which emits the RGB cells in scanline order following the pattern of the mosaic. There are no special timing requirements for this block.

A red address generator 40 receives 8 bit non-linear red data values as well as timing from the mosaic demultiplexer. Its outputs include the same 8 bit non-linear red data values, a block number indicating which red 8×8 block is to contain this 8 bit value, the cell number which is an index from 0 to 63 indicating the position of the cell within the specified block, and a block done signal that is raised to indicate that the specified block has been completed. The block done signal is raised only after the last data value has been loaded; when the block done signal is raised, the 8 bit data value and the cell number do not contain meaningful information. The red address generator contains no buffers for the 8 bit data. It does however contain a number of registers that are dynamically loaded via USB. These registers are related to the dimensions of the sensor image. This block receives timing from the mosaic demultiplexer; there are no internal buffers and no special timing requirements.

A blue address generator 42 is nearly identical to the red address generator, although their timing is not synchronized because the red data and the blue data are streamed from the sensor at different times. Since both the red and blue grids in the sensor array are rectilinear, their design is straightforward. This block has no internal buffers and no special timing requirements.

A green address generator 38 is functionally similar to the red and blue address generators. Its design differs from the red and blue address generators because the green mosaic cells are arranged differently than the red and blue data; it is not rectilinear with respect to the sensor edges.

Figure 3:
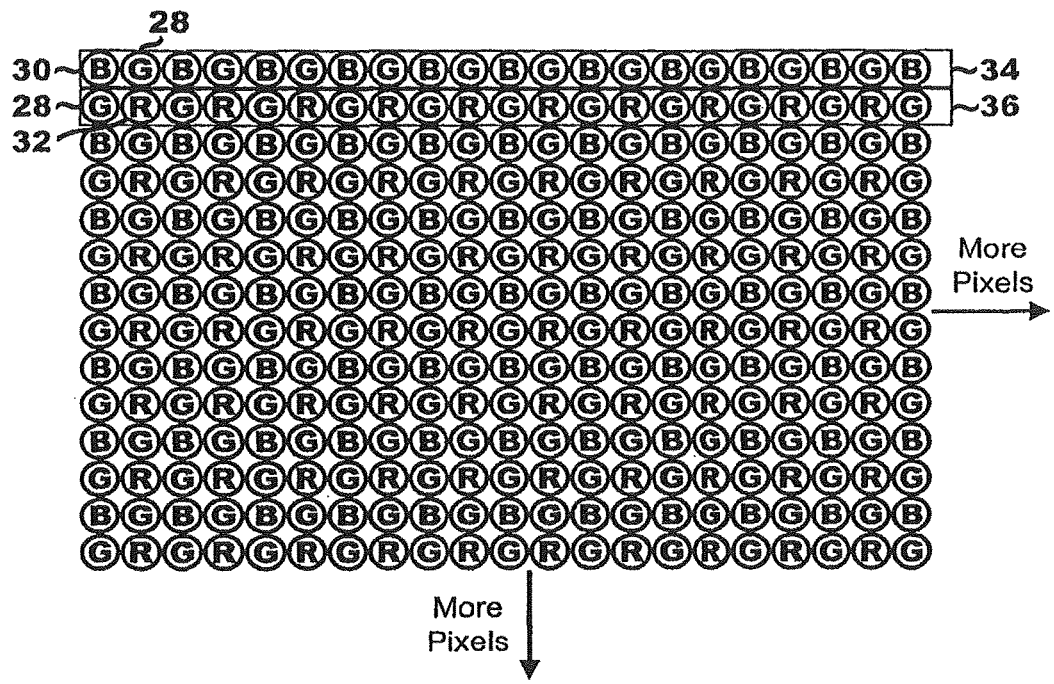
FIG. 3 is a representation of a CMOS sensor with an RGB mosaic.

The operation of the green address generator will be discussed in reference to FIGS. 3-9. In FIG. 3, the CMOS sensor represented is a mosaic of 352×288 pixels or cells, though the representation shown here is cropped, i.e. is a subset of the full mosaic. More particularly, the mosaic includes red (r) pixels 32, green (g) pixels 28, and blue (b) pixels 30. The pixels form a part of scan lines, such as scan lines 34 and 36. The mosaic represents three color planes, with discrete samples for each of the colors. The discrete samples are not co-located, so there is no single location for which more than one color is available. The mosaic can be split into three separate grids, one for each of the RGB colors.

The human eye is very sensitive to luminance (non-color brightness) data, and less sensitive to chrominance (color) data. The luminance data must therefore be represented in higher resolution than the chrominance data if the design is to be optimally efficient. Since most of the luminance data is carried by the wavelengths detected by the green filter, there is an emphasis on the density of the green mosaic cells in the geometry of the mosaic.

Figure 4:
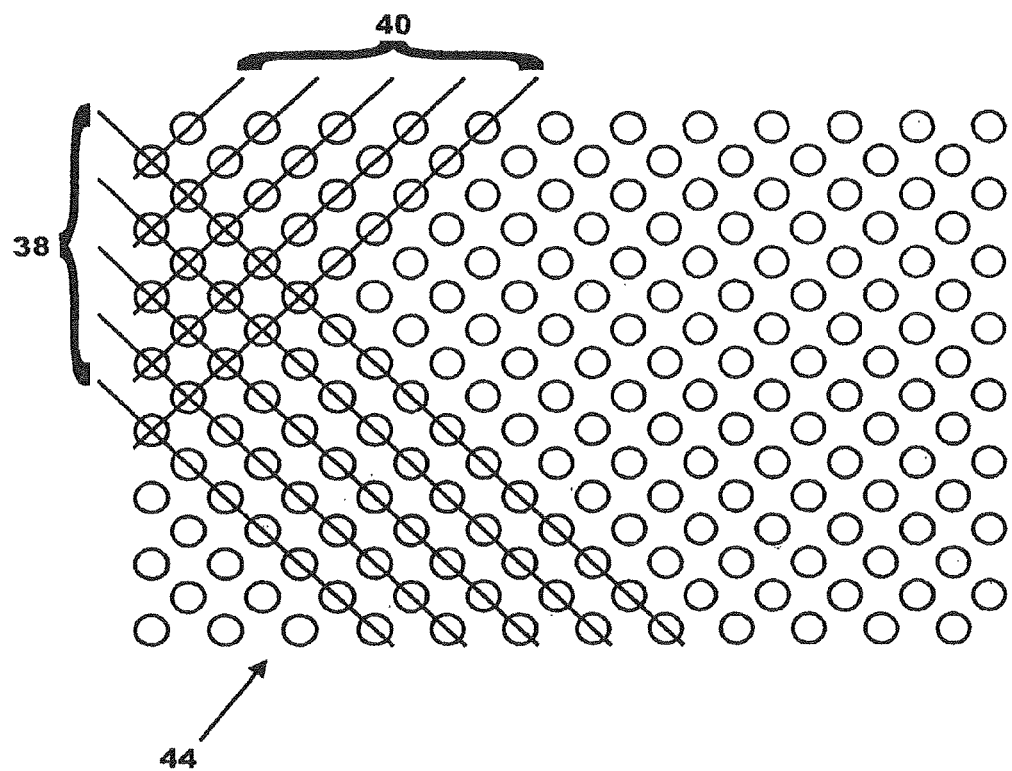
FIG. 4 illustrates the green mosaic cells.

As seen in FIG. 4, a green mosaic 44 forms a crosshatch pattern, as illustrated by diagonal lines 38 and intersecting diagonal lines 40. The geometry of the green mosaic 44 does not easily lend itself to compression via DCT because it is not easy to form 8×8 blocks. The cells of the green mosaic are formed into 8×8 blocks by the green address generator which rotates the data by 45 degrees. This diagonal rotation is key to the proper and efficient functioning of the present invention, and is preferably performed without the use of trigonometric functions, but rather with simple finite state automaton, as discussed below.

Figure 5:
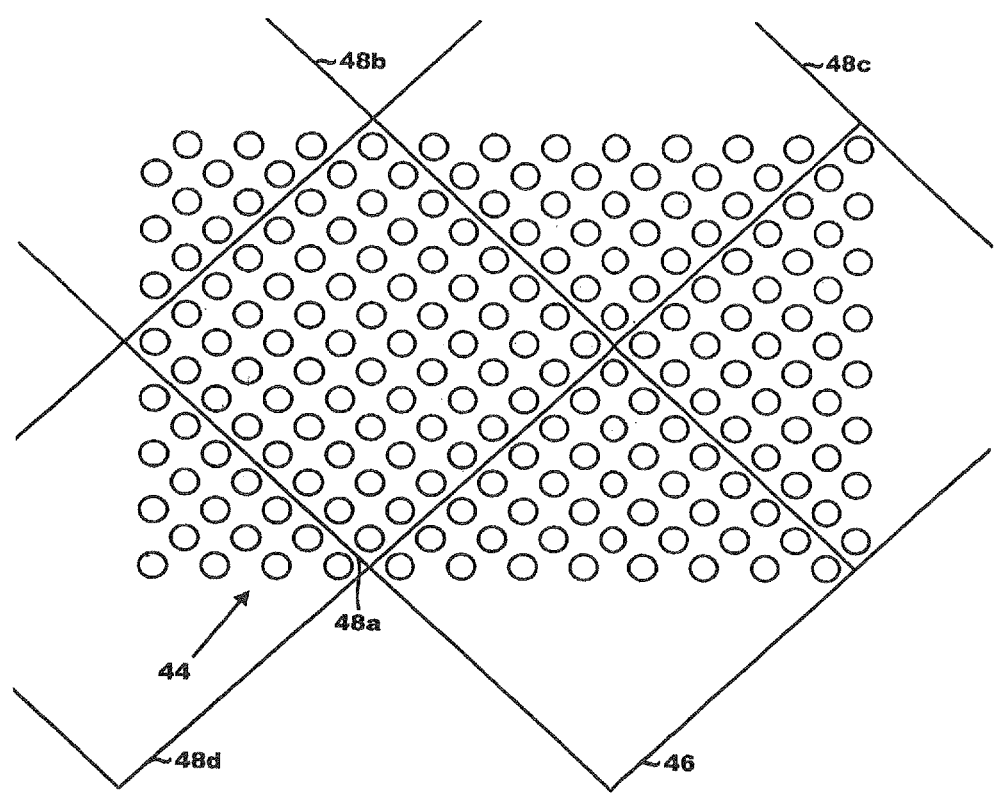
FIG. 5 illustrates a superimposed transverse grid.

To explain the rotation process, FIG. 5 shows a transverse grid 46 superimposed over the green mosaic 44 which identifies the boundaries between diamond-shaped 8×8 blocks 48 of the grid 46 and which data values each contains. Each block 48 (e.g. 48a, 48b, 48c, 48d) contains up to 64 data values, although those near the edge of the mosaic contain less, as illustrated.

Figure 6:
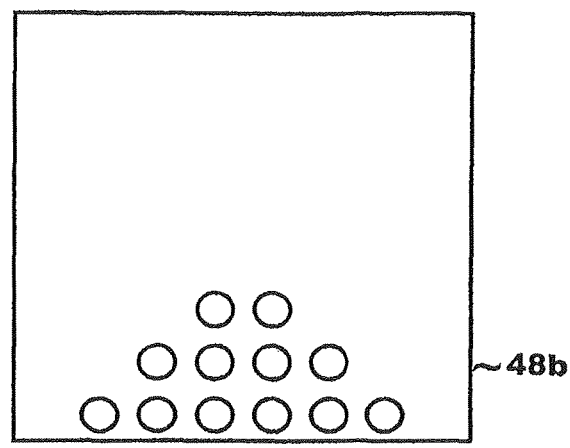
FIGS. 6-9 show a variety of configurations of data within a green block.
Figure 7:
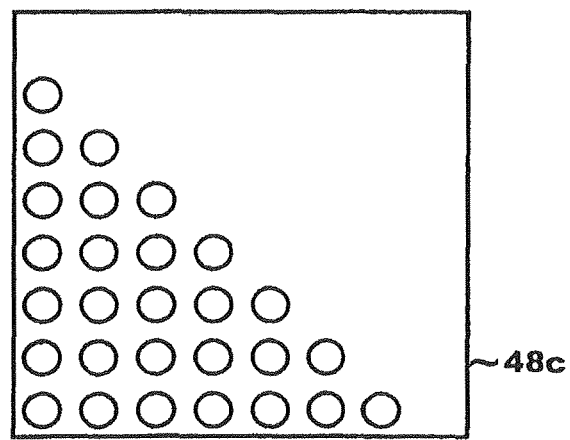
Figure 8:
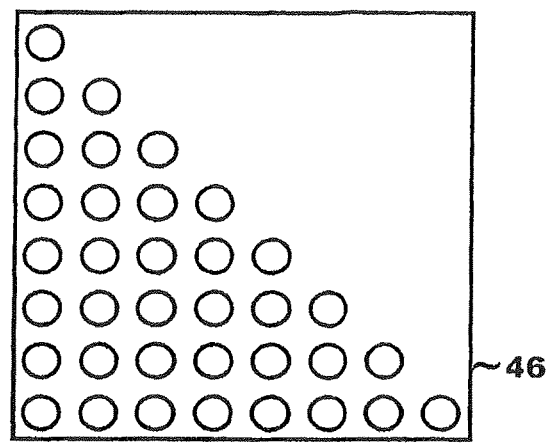
Figure 9:
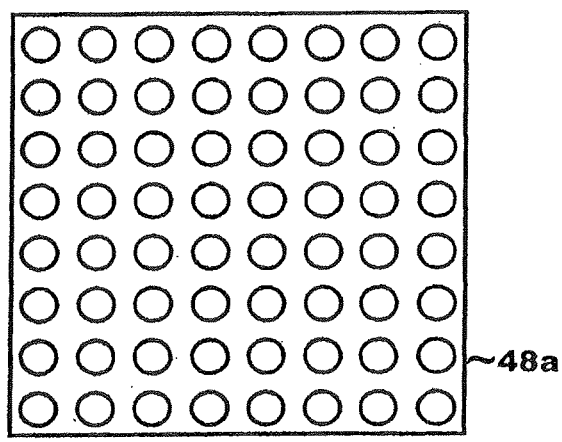

FIGS. 6 through 9 show a variety of configurations of data within a green block. The most common configuration is the configuration shown in FIG. 9, which shows a full block of green data. More particularly, FIG. 6 illustrates a rotated upper left corner block 48b, FIG. 7 illustrates a rotated top edge block, FIG. 8 illustrates a rotated left edge block (not shown), and FIG. 9 illustrates a rotated full block 48a.

Referring again to FIG. 2, RGB block buffers 50 are used to buffer the 8 bit RGB values in groups of 64 samples. In the case of green edge blocks, many of those values may be null. The block buffers receive 8 bit values one at a time from their respective sources, along with addressing information specifying the block number and the position within the block. The block number is a number ranging from 0 to the total number of blocks in a single frame for a given color (red green or blue.) The block buffer is efficient in that it does not require 64 bytes of memory for each block number in the image; instead it uses the block number as an identifier for a specific block, similar to a cache line identifier. If that block exists, the value is placed within it at the specified location. If it does not, then a new block is allocated from the pool of blocks.

This design maps cleanly to cache RAM technology. A single pool of blocks can be used for three colors. A two bit color identifier is appended to the block number, and the resulting unique block number can be used as a cache line identifier. The result is that the design can be highly efficient with respect to memory.

When a "block done" signal is received, the 64 bytes for that block are streamed out, and the block is de-allocated from the pool. The amount of memory required by this block varies with respect to sensor width. For a 352×288 sensor, 22 blue blocks, 22 red blocks, and 46 green blocks will be required. This implies a memory requirement of approximately 5760 bytes of memory. This requirement will obviously increase if the size of a cache line is not an even multiple of the 64 bytes. This block has no special timing requirements, but does require interface logic to a cache RAM.

An alternative implementation uses a static RAM instead of a cache RAM. In this implementation, the buffer is used in a cyclic manner. This implementation generates memory addresses directly rather than allocating blocks from a pool, as will be appreciated by those skilled in the art.

In 8 bit FIFO buffers 18 the data such that it does not overrun the Discrete Cosine Transform (DCT) because the DCT requires some time to process the 8×8 blocks. The size of this FIFO depends on the timing of the DCT which is to be defined in a future document. FIFOs of this design are well known to those skilled in the art.

Discrete Cosine Transform block 20 is used to convert 8×8 blocks into the frequency domain. This block will require the use of a multiplication circuit and will apply approximately 14 multiplies for each DCT block. The DCT of the described embodiment of the present invention use coefficients that are suited for RGB values, not Luminance/Chrominance or "YUV", although other preferred embodiments of the present invention can be provided for YUV, as will be appreciated by those skilled in the art. As a part of the DCT operation various data reduction operations may be performed, including quantization that reduces the accuracy of DCT coefficients to achieve greater compression. Quantization is used in JPEG and MPEG standard algorithms. DCT blocks such as this are well known to those skilled in the art. Furthermore, while DCT compression is a good example of a rectilinear compression algorithm, those skilled in the art will recognize that other forms of rectilinear compression algorithms are also suitable, such as wavelet compression.

A run length encoding (RLE) block 22 identifies patterns in the amplitudes that are emitted from the DCT and compress them by generating a count for the number or repetitions that are seen in the data. Run length encoding often includes a "zigzag" traversal of the coefficients, such as is defined in the JPEG and MPEG standards. This traversal of the coefficients is performed so that coefficients in similar portions of the 8×8 grid are grouped together, which can cause the runs of zeros to be longer because coefficients with similar frequencies are grouped together sequentially. Longer runs of zeros yield better compression. Run length encoding blocks such as this are well known to those skilled in the art.

A Huffman compressor 24 uses a predefined code book to reduce the bit length of commonly transmitted codes. Huffman compressors are well known to those skilled in the art, as are Universal Serial Bus (USB) interfaces 26.

It will therefore be appreciated that an apparatus for diagonal processing of video data in accordance with the present invention includes a demultiplexer 14 receptive to a video stream (i.e. 8 bit non-linear mosaic samples) and developing a plurality of separated color planes (e.g. R, G, and B color planes, where the G color plane is shown in FIG. 4); at least one of which is a rectilinear color plane (in this example the R and B color planes) and at least one of which is a rotated color plane (in this example the G color plane). In other embodiments of the present invention, the R and B color planes may be rotated, while the G plane may be rectilinear. Also, color planes in other color spaces such as YUV or CMY will have at least one rectilinear plane and at least one rotated plane. The apparatus further includes a number of address generators (e.g. 38, 40, and 42) associated with the plurality of color planes (in this example the green, red, and blue color planes, respectively), wherein an address generator 38 associated with the rotated color plane (green) is operative to rotate the rotated color plane to a rectilinear position. The apparatus further includes a data compressor (such as compressor 20) receptive to the address generators and operative to compress the plurality of color planes with a rectilinear compression algorithm (e.g. DCT compression 20).

Second Example Implementation

Figure 10:
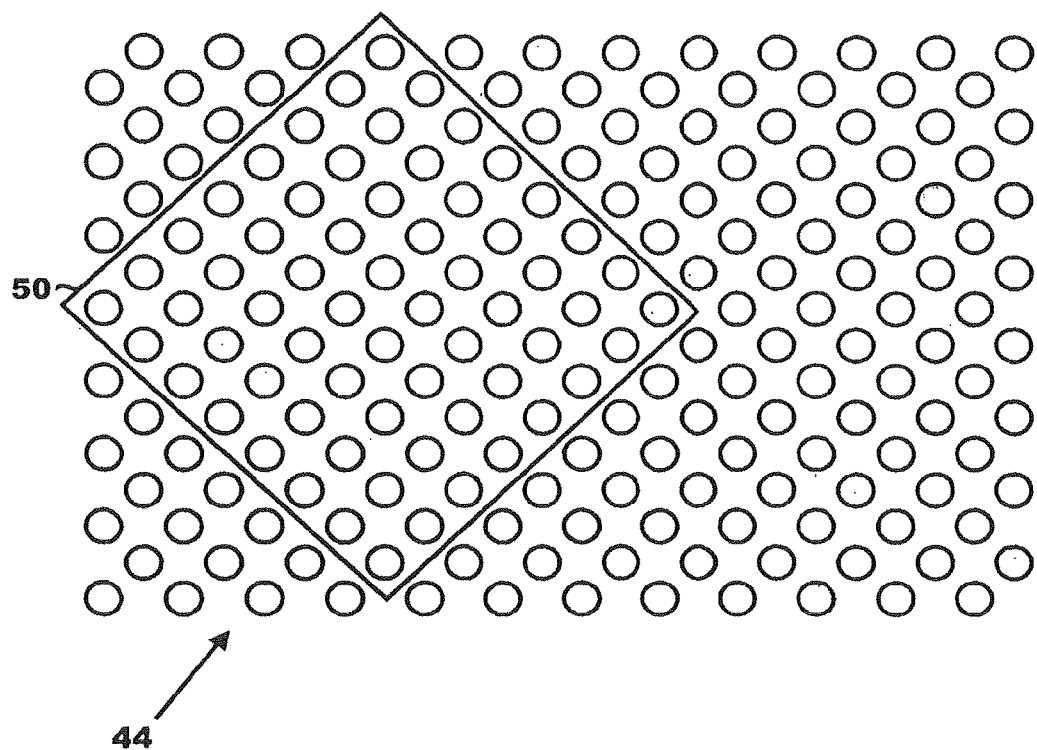
FIG. 10 is an illustration of a diagonal preprocessing block, with red and blue pixels removed, of the method of the present invention.

A alternative diagonal processing method of the present invention assembles the green mosaic 44 into a diamond pattern 50, resembling a standard DCT block rotated by 45 degrees, as seen in FIG. 10. This is similar to the process described previously; however, the corners are handled differently in this embodiment of the present invention compared to the previously described embodiment.

The diamond pattern 50 allows for minimal spacing between pixels in the block for processing, and therefore a better quality image. Further, by using the diagonal processing method of the present invention, the diagonal processing is easily implemented in hardware. The advantage of this alternative method is that it uses a simpler address generator than that disclosed previously. That is, the address generator of this alternate embodiment can be implemented as an uncomplicated address look-up table, as will be described in greater detail below.

Figure 11:
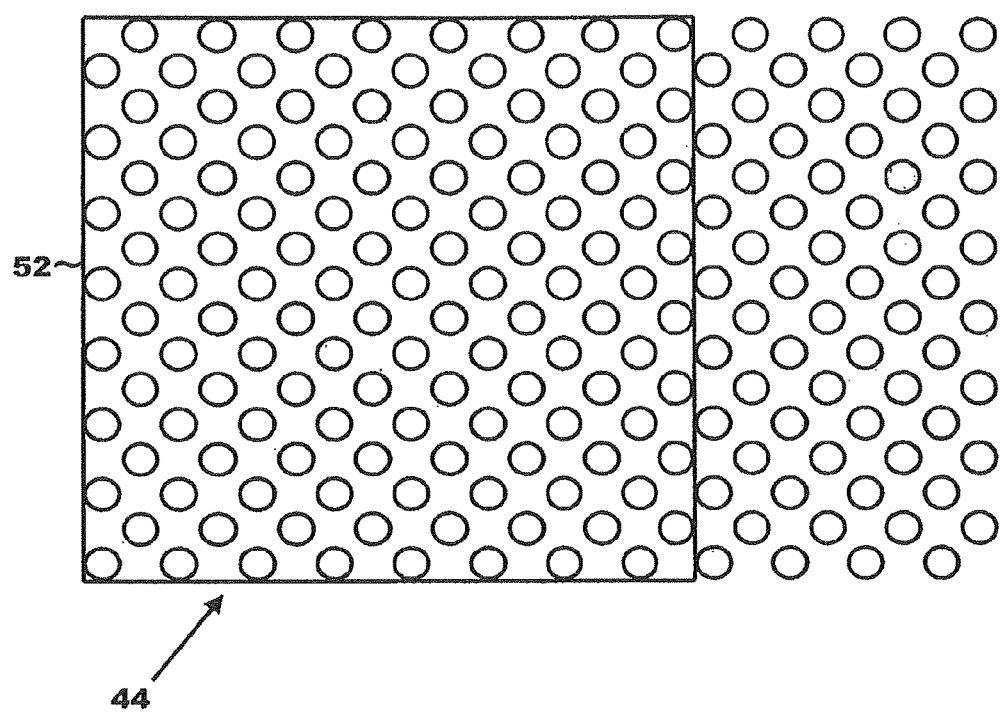
FIG. 11 is an illustration of a "big green block" with red and blue pixels removed.

The process of the present invention begins with data being fed from the sensor and assembled into three types of blocks: red, blue, and "Big Green" (BG). The red and blue blocks are rather straightforward; blocks of a designated size are produced with no special handling. For example an 8×8 pixel block will occur every 8 pixels of the specified color across, and have a height of 8 pixels. The BG blocks 52, as seen in FIG. 11, extend twice the desired width and twice the desired length of a DCT block (such as used for the red and blue pixels), with every other row and column in a crosshatched pattern.

The red and blue blocks are ready for processing. The BG block, however requires one more bit of handling. Feeding the BG block into a specifically designed lookup table, an example of which is attached as Appendix A, will produce two DCT blocks of the desired size, ready for processing. The first block is 54 cut from the center of the BG block in 52 a diamond shape (see FIG. 12), the second block 56 produced by assembling the leftover corners (see FIG. 13).

Figure 12:
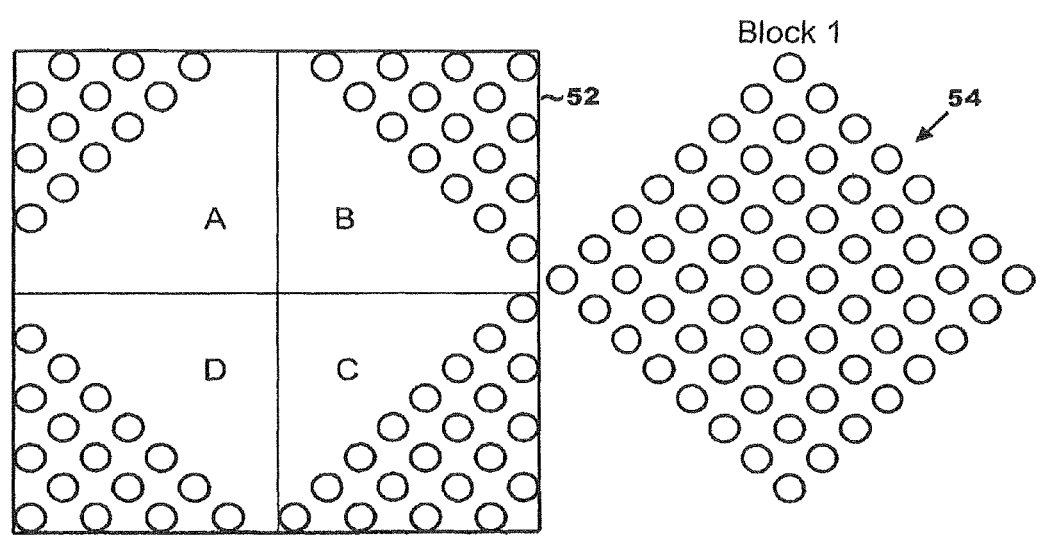
FIG. 12 is an illustration of a first block "Block 1" removed from the big green block and leftover corners, ready for transposition and assembly into another block.

In FIG. 12, "Block 1" 54 is shown to be removed from Big Green Block and leftover corners, ready for transposition and assembly into another block. Horizontal 180° transposition. in addition to 180° vertical transposition is a preferred method to produce the second block from the leftover corners, though other techniques can be used, as will be apparent to those skilled in the art.

Figure 13:
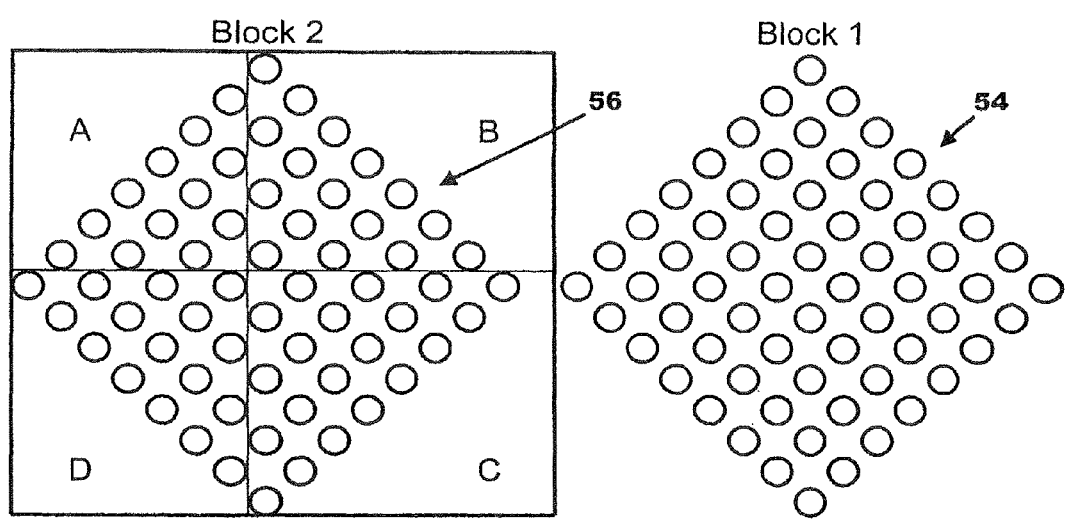
FIG. 13 is an illustration of a second block produced from the corners of the big green block next to Block 1, produced from the center of the big green block.

In FIG. 13, a "Block 2" 56 produced from corners of BG 52 is shown next to "Block 1" 54, that was produced from the center of the BG block 56. This can also be achieved through the use of a "RGGB" algorithm, as will be appreciated by those skilled in the art, and which will be discussed in greater detail subsequently.

Figure 13A:
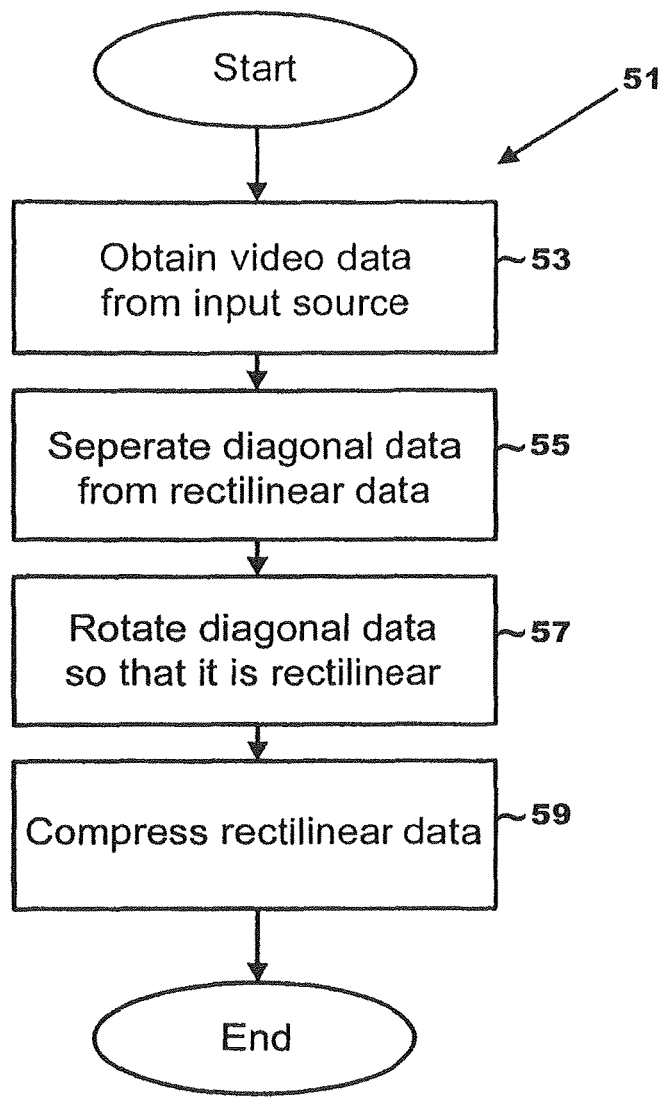
FIG. 13a is a flow diagram illustrating a diagonal processing process of the present invention.

In FIG. 13A, a method 51 for diagonal processing of video data begins with an operation 53 of obtaining video data from an input source. This input source may be a video sensor array, or may be a digital storage or transmission medium. An operation 55 separates diagonally arranged data from rectilinearly arranged data in the video stream. Next, an operation 57 rotates the diagonally arranged data to a rectilinear position, and an operation 59 compresses the rotated diagonally arranged data by a rectilinear compression algorithm.

Figure 14:
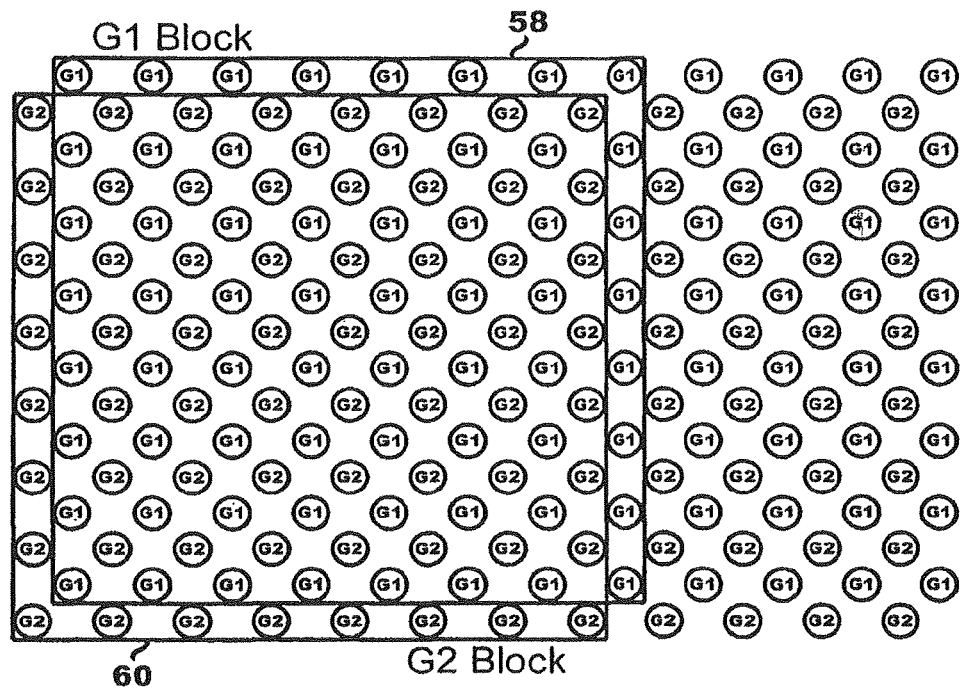
FIG. 14 is an illustration of overlapping "RGGB" type blocks, next to the resulting G1 or G2 type block.
Figure 15:
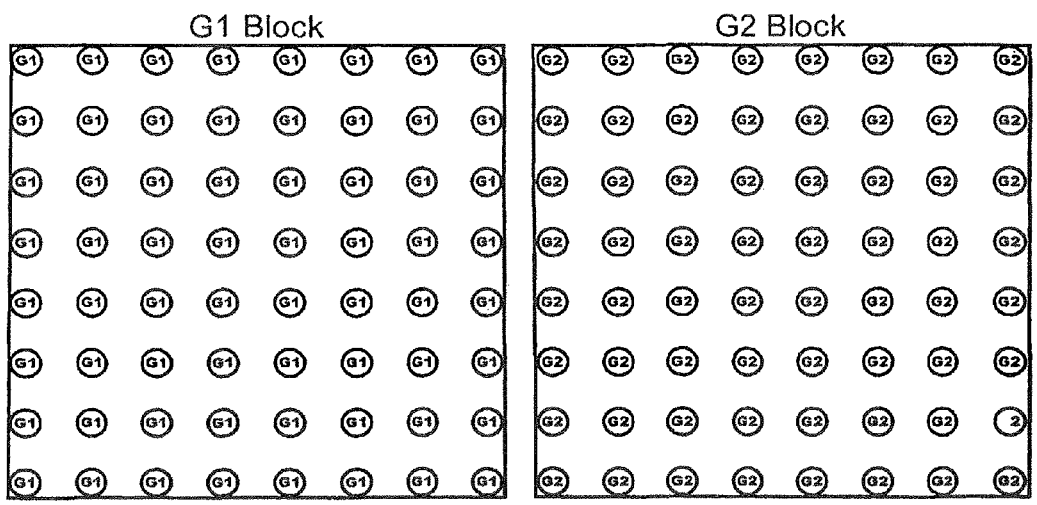
FIG. 15 is an illustration of the two types of green blocks used in the RGGB process, namely the G1 Block and the G2 Block.

As seen in FIG. 14, an RGGB algorithm is one in which the red and blue blocks are assembled in the same way as described above, but the resulting green crosshatch of pixels is separated into two separate types of blocks, green one G1 block 58 and green two (G2) block 60. The G1 blocks 58 are assembled from the pixels of every other row starting with the first. The G2 blocks 60 are produced from the pixels of every other row starting with the second. The pixels of G1 and G2 blocks overlap in the mosaic, as shown in FIG. 14. It should be noted that the G1 and G2 blocks are diagonally related. Once separated, as illustrated in FIG. 15, the G1 and G2 blocks look similar to other compression blocks. A G1 and a G2 block that had overlapped in the mosaic can be used in the same way that a BG block is used for Diagonal Preprocessing, with only minor changes to the lookup table. That is, once the blocks are fed through the various compression and decompression mechanisms, an inverse lookup table corresponding to the first lookup table can be used to reassemble the data into a form that can then be interpolated or processed in another manner, as will be appreciated by those skilled in the art.

In summary, by feeding either a Big Green (BG) block or two smaller, overlapping blocks through a lookup table to assemble compression blocks from the center diamond and corners, the diagonal preprocessing of the resent invention can be implemented without any significant reduction in quality. That is, a method for processing of video data in accordance with the present invention includes recognizing diagonally arranged data in a video stream by one or more of a variety of methods, processing the diagonally arranged data into rectilinear data, and then compressing the rectilinear data by a rectilinear compression algorithm.

A working look-up table that utilizes the BG method of the present invention is attached hereto as "Appendix A", and forms a part of this disclosure. The method named "grinder" takes two blocks and reassigns the x and y coordinates of each pixel within the block to get two diagonal preprocessing blocks. After reassigning the address of every pixel to that of a Diagonal Processing block, the new blocks are sent on to be compressed.

Figure 16:
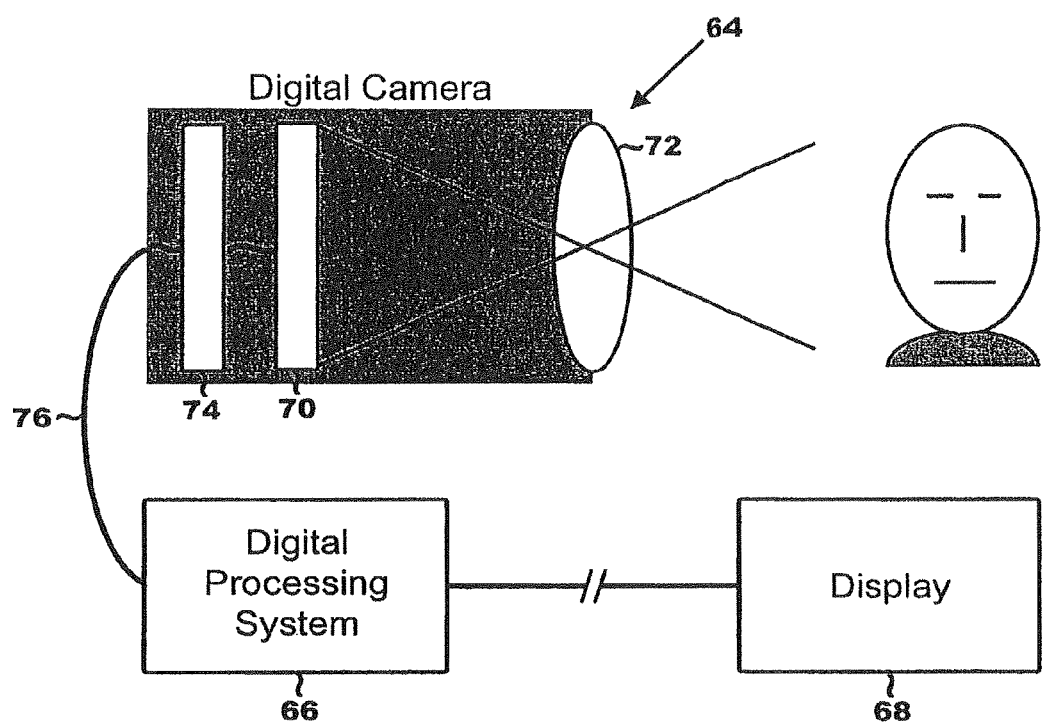
FIG. 16 is an illustration of a digital camera system of the present invention coupled to a digital processing system.

In FIG. 16, a digital camera system of the present invention includes a digital camera 64, a digital processing system 66 (such as a personal computer), and a video display 68 or other output device, such as a color printer. The digital camera includes a sensor 70 (such as a CMOS sensor array developed, for example, be Lucent Technology, Inc.), a lens assembly 72 (or other optics) for focusing an image I on the sensor 70, and an integrated circuit 74 or "chip" coupled to the sensor 70 for preprocessing the sensor data as described previously. A cable, bus, or other communication link 76 couples the digital camera to the digital processing system, and an image is developed on the video display or other output device.

Figure 17:
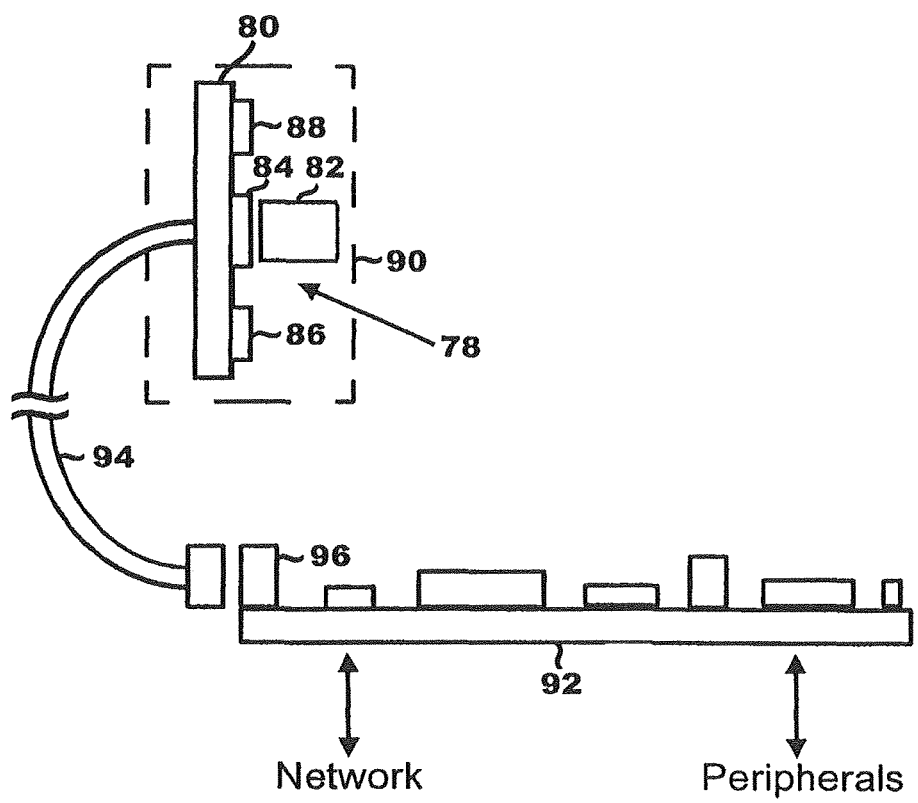
FIG. 17 is an illustration of a digital camera system utilizing a camera module.

A digital camera system utilizing a camera module 78 is illustrated in FIG. 17. The module 78 includes a support such as a printed circuit board 80, a lens assembly 82, a sensor 84 aligned with the lens assembly 82, an encoder chip 86 including the diagonal processing of the present invention, and other support and/or "glue" chips 88. For example, a support chip 88 can provide a Universal Serial Bus (USB) functionality. Alternatively, most or all of the support and "glue" functions can be integrated into the encoder chip 86. The module 78 can be enclosed within any suitable enclosure 90, such as a camera body, the chassis of a personal computer, into a personal computer monitor (e.g. above the CRT), into a laptop computer, into a hand-held (e.g. "Palm" or PDA) computer, into a portable or land-line telephone, etc.

The module 78 can be coupled to a digital processing system such as a personal computer motherboard 92. In this example, the module 78 can be coupled with a cable 94 to the USB port 96 of the personal computer motherboard 92. Alternatively, other ports, such as a serial port, parallel port, or a custom port provided by, for example, a plug-in card can be used to couple the module 78 to the motherboard 92. Still further, the module can be mounted directly onto the motherboard, or the components of the module 78 can be mounted directly on the motherboard.

The motherboard 92 can be coupled to a network, as will be appreciated by those skilled in the art. It can also be coupled to a variety of peripherals, such as disk drive units, CD-ROM drives, DVD drives, monitors, keyboards, pointer devices, etc. The network can include, for example, a local area network (LAN), a wide area network (WAN) such as the Internet, and/or other TPCIIP protocol networks.

It should be noted that the electronic circuitry of the module, such as the encoder and USB, need not receive its digital input from a lens assembly and sensor array, as shown. For example, the encoder can be integrated into the motherboard or into a plug-in card attached to the motherboard, or can be coupled to one of the ports of the motherboard, in order to transmit encoded (compressed) video signals received from, for example, a hard disk, CD-ROM, or DVD coupled to the motherboard as a peripheral. A driver, typically stored as binary computer instructions on a hard disk coupled to the motherboard, decodes (i.e. decompresses) encoded data created by the diagonal processing of the present invention. This driver is typically implemented in software, although it, like the encoder, can be implemented in hardware or firmware, as will be appreciated by those skilled in the art.

Transverse DCT Model for Creating Address Generators

The following is a description of the process by which the code for the green address generator is generated. The green address generator receives serially all of the green dots in the mosaic and loads them into a staging buffer. 8×8 blocks reconstructed in the staging buffer. When a block is completed, the green address generator signals that the block is completed and it is emitted to the DCT. The portion of the buffer occupied by the emitted block is then reused by other incoming dots.

The staging buffer is segmented into 8×8 blocks. Each 8×8 block in the buffer is geometrically associated with a diamond shaped region in the image. Once all the dots in that diamond shaped region are collected, the block is complete. Note that some blocks do not contain 64 elements. Once the block is emitted, the associated memory is then associated with a new diamond shaped region below the previous one.

Described below are a number of mathematical transformations that are used to determine where the mapping between the green mosaic dots and the green block staging buffer. The coordinates are transformed, but the order is unchanged. This allows the model to establish a mapping between the "serial number" of the dots and where they end up in the green buffer. By analyzing this mapping, code is generated which mimics the transformations performed by the model.

The model begins by generating a full CIF sized mosaic of pixels. No data is needed; only the positions of the pixels are generated. Two nested loops are used to generate the pixel positions. The outer loop generates the scan line number, and the inner loop generates the pixel number. The scan line number is referred to as j and the pixel number is referred to as i. It is important to note that the positions are generated in the same order as the sensor emits them. The pixel positions are represented as a stream of coordinate pairs. Each coordinate pair represents a single position in the mosaic. Each of the three colors is represented in this stream.

In order to model the green machine, the red and blue positions must be filtered out so that only the green positions are present in the filtered stream. Each of the generated positions is evaluated to determine whether or not it is a green pixel. The means for evaluating whether or not a pixel is green is based on whether the respective values for i and j are even or odd. The logic used is as follows; (note that zero based indexes are used in these expressions):

$$jIsOdd = (j \bmod 2 \neq 0)^1$$

$$iIsOdd = (i \bmod 2 \neq 0)^1$$

$$isGreen = (iIsOdd \neq jIsOdd)$$

The stream is filtered such that only positions for which i and j result in a value of true for is Green are permitted to pass through the filter. The number of positions in the data stream is thus reduced by half, since half of the dots in the mosaic are green. It should be noted that this filtering process results in a set of points that form a cross hatch pattern. Each green dot has four neighboring green dots juxtaposed diagonally. The edges are of course an exception: some green dots have less than four neighbors. Note that the distance between neighboring green dots juxtaposed diagonally) is the square root of two.

The data stream that contains only the positions of the green pixels is still ordered according to the order of the data emitted by the sensor. In preparation for a geometric rotation of the coordinate pairs, the coordinate pairs must be translated so that the "origin" of the coordinate system is located at a position corresponding to a green dot. Recall that in the upper left corner of the mosaic, the first pixel, at position (0,0) is blue. All red and blue pixels have of course been filtered out of the stream. It is adequate for the purposes of the model that the origin is centered on any green dot. In this model the first green dot is mapped to the origin. The first green dot is located at position (1,0). Thus, one must be subtracted from the x coordinate of every green dot in the filtered stream in order to translate the origin as follows:

$$translatedX = x - 1$$

$$translatedY = y$$

The resulting stream of coordinate pairs contains only green coordinate pairs that have been translated such that the origin is positioned at the first green dot. Next a rotation operation is performed. The data is rotated by 45 degrees clockwise around the origin. The formulae for rotation are shown-below:

$$rotatedX = \operatorname{Cos}\left[theta + \frac{\pi}{4}\right] * distance$$

$$rotatedY = \operatorname{Sin}\left[theta + \frac{\pi}{4}\right] * distance$$

$$theta = A\tan2[y, x]$$

"distance" represents the Euclidean distance between the origin and the unrotated point, computed using the Pythagorean theorem:

$$distance = \sqrt{x^2 + y^2}$$

Note that the coordinate system used here has y increasing in the downward direction in order to be compatible with the scan line numbering used above, and is thus left handed. The rotation operation on defined here results in a stream of rotated coordinate pairs corresponding to the position of the green dots in the original mosaic.

At this point it is important to note that the juxtaposition of neighboring points has changed: neighboring points are no longer positioned diagonally with respect to each other, but rather rectilinearly. Each green dot still has four neighboring green dots, but their positions are rectilinear with respect to each other. It should also be noted that the distance between two green dots (before and after rotation) is the square root of two. It should further be noted that the rotation causes many points to have negative values for x.

The coordinate pairs have been transformed so that the green dots can be organized in a rectilinear grid. Before this can be done the data must be scaled so that the distance between neighboring points is one. To achieve this the points are scaled as follows:

$$scaledX = \frac{x}{\sqrt{2}}$$

$$scaledY = \frac{y}{\sqrt{2}}$$

Once this scaling operation is completed, the stream contains coordinate pairs where each coordinate is an integer, and the juxtaposition of geometrically neighboring points is rectilinear. At this point, it is possible to determine for each point which of the dianlond shaped 8×8 regions it falls into. In the current rotated space, the diamond shaped regions are square. To identify which 8×8 region, or "bin" a particular point falls into, the following formulae are used:

$$binX = \text{Floor}\left[\frac{x}{8}\right]$$

$$binY = \text{Floor}\left[\frac{y}{8}\right]$$

Note that binX is sometimes negative. It is also possible to determine where within the 8×8 bin a given point will land:

column=x−binX*8 row=y−binY*8

Since it is possible to generate the identity of the bin associated with a given dot, and the position within the bin, it is now possible to know where in the buffer the point will map to. Before this process takes place, a pass is made over the stream of points in order to count how many points land in each bin. This is necessary because when the commands are generated the code for the green address generator, the command list must include "block done" commands which immediately follow the command for the last dot in a given block. A list of bins is generated, each containing a count of the dots in that 8×8 block. The maximum for the count is of course 64, but it is sometimes less, because the edge blocks are not fully populated.

Once the counting process is completed, it is finally possible to generate a command list for the green address generator. A second pass is initiated, which regenerates the stream of coordinate pairs. The pairs go through all of the same filters and transformations as before. For each coordinate pair of the resulting stream, a bin identity and position are generated.

The code listing included herein (HAL) as Appendix B generates the coordinate pairs described above, and constructs a finite state automaton that can generate the same coordinate pairs. The resulting finite state automaton uses only simple logic and arithmetic to achieve the same sequence of coordinate pairs.

As will be clear to persons skilled in the art, the code listing included herein (HAL) can be easily adapted to different sensor mosaic geometries, simply by changing a few constants. In addition to generating a finite state automaton for the green address generator, HAL can be used to generate finite state automata for the red and blue address generators.

It will therefore be appreciated that a method for automatically creating address generators in accordance with the present invention includes: generating original coordinate pairs specifying the original position of each element in a sensor mosaic; transforming said original coordinate pairs into a sequence of adjusted coordinate pairs which are rectilinearly juxtaposed; and generating a finite state automaton that mimics the sequence of adjusted coordinate pairs. The finite state automaton generates addresses that are used to route data into the appropriate locations in the RGB block buffers.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations, and equivalents as fall within the true spirit and scope of the present invention.

What is claimed is:

1. A method for diagonal processing of video data comprising:
    separating diagonally arranged data from rectilinearly arranged data in a video stream with a digital processor;
    rotating said diagonally arranged data to a rectilinear position with said digital processor; and
    compressing said rotated diagonally arranged data by a rectilinear compression algorithm executing on said digital processor.

2. A method for diagonal processing of video data as recited in claim 1 further comprising performing a gamma correction on said video stream before separating diagonally arranged data.

3. A method for diagonal processing of video data as recited in claim 2 wherein rotating said diagonally arranged data includes feeding said diagonally arranged data through an address generator.

4. A method for diagonal processing of video data as recited in claim 1 wherein said rectilinear compression algorithm is at least one of a DCT compression and a wavelet compression.

5. A method for diagonal processing of video data as recited in claim 4 further comprising performing additional compression on the output of the rectilinear compression algorithm.

6. A method for diagonal processing of video data as recited in claim 1 wherein said method is implemented with program instructions stored in non-transitory digital processor readable media.

7. A method for diagonal processing of video data as recited in claim 1 wherein said digital processor forms a part of an integrated circuit.

8. A method for diagonal processing of video data as recited in claim 7 wherein said integrated circuit forms a part of a camera module.

9. A method for diagonal processing of video data as recited in claim 8 wherein said camera module further includes a printed circuit board supporting said integrated circuit, a video sensor, and a lens assembly aligned with said video sensor.

10. An apparatus for diagonal processing of video data comprising:
    a demultiplexer receptive to a video stream and developing a plurality of separated color planes, at least one of which is a rectilinear color plane and at least one of which is a rotated color plane;
    a number of address generators associated with said plurality of color planes, wherein an address generator associated with said rotated color plane is operative to rotate said rotated color plane to a rectilinear position; and
    a data compressor receptive to said address generators and operative to compress said plurality of color planes with a rectilinear compression algorithm.

11. An apparatus for diagonal processing of video data as recited in claim 10 further comprising:
a gamma corrector receptive to said video stream to perform a gamma correction on said video stream prior to inputting said video stream into said demultiplexer.

12. An apparatus for diagonal processing of video data as recited in claim 11 wherein said color planes are red, green, and blue color planes, and wherein said rotated color plane is said green color plane.

13. An apparatus for diagonal processing of video data as recited in claim 12 wherein said data compressor is one of a DCT compressor and a wavelet compressor.

14. An apparatus for diagonal processing of video data as recited in claim 10 further comprising at least one additional compressor further compressing the output of said data compressor.

15. An apparatus for diagonal processing of video data as recited in claim 10 further comprising a video sensor array for developing said video stream.

16. An apparatus for diagonal processing of video data as recited in claim 15 further comprising optics for directing an image to said video sensor array.

17. An apparatus for diagonal processing of video data as recited in claim 16 further comprising a bus interface receptive to data from said data compressor.

18. An apparatus for diagonal processing of video data as recited in claim 17 further comprising a digital processing system coupled to said bus interface.

19. An apparatus for diagonal processing of video data as recited in claim 18 wherein said digital processing system is a personal computer system.

20. A method for processing of video data comprising:
recognizing diagonally arranged data in a video stream with a digital processor;
processing said diagonally arranged data into rectilinear data with said digital processor; and
compressing said rectilinear data by a rectilinear compression algorithm executing on said digital processor.

\* \* \* \* \*